US009641491B2

(12) United States Patent
Kaluzhny et al.

(10) Patent No.: US 9,641,491 B2
(45) Date of Patent: May 2, 2017

(54) SECURE MEMORY INTERFACE WITH CUMULATIVE AUTHENTICATION

(71) Applicant: Winbond Electronics Corporation, Zhubei (TW)

(72) Inventors: Uri Kaluzhny, Beit Shemesh (IL); Nir Tasher, Tel Mond (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 0 days.

(21) Appl. No.: 14/311,396

(22) Filed: Jun. 23, 2014

(65) Prior Publication Data

US 2015/0089234 A1    Mar. 26, 2015

Related U.S. Application Data

(60) Provisional application No. 61/880,932, filed on Sep. 22, 2013.

(51) Int. Cl.
| | |
|---|---|
| *H04L 9/32* | (2006.01) |
| *H04L 29/06* | (2006.01) |
| *G06F 21/85* | (2013.01) |
| *H04L 9/06* | (2006.01) |

(52) U.S. Cl.
CPC .......... *H04L 63/0457* (2013.01); *G06F 21/85* (2013.01); *H04L 9/0662* (2013.01); *H04L 9/3247* (2013.01); *H04L 63/0428* (2013.01)

(58) Field of Classification Search
CPC . H04L 63/0428; H04L 9/0662; H04L 9/3247; G06F 21/85
See application file for complete search history.

(56) References Cited

U.S. PATENT DOCUMENTS

| | | | |
|---|---|---|---|
| 4,521,853 A | 6/1985 | Guttag | |
| 5,671,283 A * | 9/1997 | Michener | ............ H04L 9/0625 380/29 |
| 5,703,952 A | 12/1997 | Taylor | |
| 6,272,637 B1 | 8/2001 | Little et al. | |
| 6,915,175 B2 | 7/2005 | Ahn | |
| 6,976,136 B2 | 12/2005 | Falik et al. | |

(Continued)

FOREIGN PATENT DOCUMENTS

| | | | |
|---|---|---|---|
| AU | 2001027074 B2 | 7/2001 | |
| CH | EP 1615370 A1 * | 1/2006 | ........... H04L 63/123 |

(Continued)

OTHER PUBLICATIONS

European Application # 14184824.2 Search Report dated Feb. 12, 2015.

(Continued)

*Primary Examiner* — Carl Colin
*Assistant Examiner* — Vance Little
(74) *Attorney, Agent, or Firm* — D. Kligler IP Services Ltd.

(57) ABSTRACT

A method includes generating a first sequence of data words for sending over an interface. A second sequence of signatures is computed and interleaved into the first sequence, so as to produce an interleaved sequence in which each given signature cumulatively signs the data words that are signed by a previous signature in the interleaved sequence and the data words located between the previous signature and the given signature. The interleaved sequence is transmitted over the interface.

14 Claims, 4 Drawing Sheets

(56) References Cited

U.S. PATENT DOCUMENTS

| | | |
|---|---|---|
| 7,082,539 B1 | 7/2006 | Kitahara et al. |
| 7,194,626 B2 | 3/2007 | Craft |
| 7,248,696 B2 | 7/2007 | Craft et al. |
| 7,269,747 B2 | 9/2007 | Catherman et al. |
| 7,739,565 B1 | 6/2010 | Lesea |
| 7,826,271 B2 | 11/2010 | Cernea |
| 7,836,269 B2 | 11/2010 | Obereiner et al. |
| 7,881,094 B2 | 2/2011 | Chen |
| 7,882,365 B2 | 2/2011 | Natarajan et al. |
| 7,889,592 B2 | 2/2011 | Kim |
| 8,041,032 B2 | 10/2011 | Katoozi et al. |
| 8,108,941 B2 | 1/2012 | Kanai |
| 8,140,824 B2 | 3/2012 | Craft |
| 8,225,182 B2 | 7/2012 | Kagan et al. |
| 8,312,294 B2 | 11/2012 | Sato et al. |
| 8,427,194 B2 | 4/2013 | Deas et al. |
| 8,429,513 B2 | 4/2013 | Smith et al. |
| 8,549,246 B2 | 10/2013 | Pekny et al. |
| 8,576,622 B2 | 11/2013 | Yoon et al. |
| 8,578,179 B2 | 11/2013 | Accicmez et al. |
| 8,745,408 B2 | 6/2014 | Mangard |
| 8,756,439 B1 | 6/2014 | Jannson et al. |
| 8,781,111 B2 | 7/2014 | Qi et al. |
| 8,832,455 B1 | 9/2014 | Drewry et al. |
| 2002/0164022 A1 | 11/2002 | Strasser et al. |
| 2003/0005453 A1 | 1/2003 | Rodriguez et al. |
| 2003/0084285 A1 | 5/2003 | Cromer et al. |
| 2003/0084346 A1 | 5/2003 | Kozuch et al. |
| 2003/0097579 A1 | 5/2003 | England et al. |
| 2003/0200026 A1* | 10/2003 | Pearson .............. G06F 8/65 701/301 |
| 2004/0260932 A1 | 12/2004 | Blangy et al. |
| 2005/0024922 A1 | 2/2005 | Li et al. |
| 2005/0039035 A1 | 2/2005 | Clowes |
| 2005/0058285 A1 | 3/2005 | Stein et al. |
| 2005/0114687 A1 | 5/2005 | Zimmer et al. |
| 2005/0123135 A1 | 6/2005 | Hunt et al. |
| 2006/0026418 A1 | 2/2006 | Bade et al. |
| 2006/0026693 A1 | 2/2006 | Bade et al. |
| 2006/0059553 A1 | 3/2006 | Morais et al. |
| 2006/0107054 A1 | 5/2006 | Young |
| 2006/0253708 A1 | 11/2006 | Bardouillet et al. |
| 2007/0133437 A1 | 6/2007 | Wengrovitz et al. |
| 2007/0192592 A1 | 8/2007 | Goettfert et al. |
| 2008/0155273 A1 | 6/2008 | Conti |
| 2009/0217377 A1 | 8/2009 | Arbaugh et al. |
| 2009/0327633 A1 | 12/2009 | Fusella et al. |
| 2010/0070779 A1 | 3/2010 | Martinez et al. |
| 2010/0098247 A1 | 4/2010 | Suumaki |
| 2010/0106920 A1 | 4/2010 | Anckaert et al. |
| 2010/0146190 A1 | 6/2010 | Chang |
| 2010/0158242 A1 | 6/2010 | Asher |
| 2010/0169654 A1 | 7/2010 | Kiel et al. |
| 2011/0022916 A1 | 1/2011 | Desai et al. |
| 2011/0185435 A1 | 7/2011 | Chang |
| 2011/0283115 A1 | 11/2011 | Junod |
| 2011/0285421 A1 | 11/2011 | Deas et al. |
| 2012/0102307 A1 | 4/2012 | Wong |
| 2012/0204056 A1 | 8/2012 | Airaud et al. |
| 2012/0275595 A1 | 11/2012 | Emelko |
| 2013/0145177 A1 | 6/2013 | Cordella et al. |
| 2013/0262880 A1 | 10/2013 | Pong et al. |
| 2013/0339730 A1 | 12/2013 | Nagai et al. |
| 2013/0339744 A1 | 12/2013 | Nagai et al. |
| 2014/0082721 A1 | 3/2014 | Hershman et al. |
| 2014/0143883 A1 | 5/2014 | Shen-Orr et al. |
| 2014/0281564 A1 | 9/2014 | Nagai et al. |
| 2015/0074406 A1 | 3/2015 | Nagai et al. |

FOREIGN PATENT DOCUMENTS

| | | |
|---|---|---|
| EP | 1615370 A1 | 1/2006 |
| EP | 2453606 A1 | 5/2012 |
| EP | 2566096 A2 | 3/2013 |
| WO | 2006092753 A1 | 9/2006 |
| WO | 2013035006 A1 | 3/2013 |

OTHER PUBLICATIONS

TCG PC Specific Implementation Specification, Version 1.1, 72 pages, Aug. 18, 2003.

TCG PC Client Specific Implementation Specification for Conventional BIOS, Version 1.20 Final Revision 1.00, 1.2; Level 2, 119 pages, Jul. 13, 2005.

TCG PC Client Specific TPM Interface Specification (TIS), Specification Version 1.21 Revision 1.00, 103 pages, Apr. 28, 2011.

TPM Main Part 1 Design Principles, Specification Version 1.2 , Revision 62, 150 pages, Oct. 2, 2003.

Java Security Architecture, 62 pages, Dec. 6, 1998.

Tasher et al., U.S. Appl. No. 14/244,000, filed Apr. 3, 2014.

Tasher et al., U.S. Appl. No. 14/467,077, filed Aug. 25, 2014.

Tasher et al., U.S. Appl. No. 14/301,456, filed Jun. 11, 2014.

JP Application # 2014192904 Office Action dated Aug. 18, 2015.

U.S. Appl. No. 15/004,957 Office Action dated Feb. 24, 2016.

U.S. Appl. No. 14/301,456 Office Action dated Dec. 22, 2015.

KR Application # 10-2014-0125216 Office Action dated Feb. 16, 2016.

U.S. Appl. No. 14/467,077 Office Action dated Sep. 30, 2015.

U.S. Appl. No. 13/965,256 Office Action dated Jun. 27, 2016.

U.S. Appl. No. 14/702,791 Office Action dated Jun. 16, 2016.

Zhuang, H.,"HIDE: An Infrastructure for Efficiently Protecting Information Leakage on the Address Bus", Proceedings of the 11th international conference on Architectural support for programming languages and operating systems (ASPLOS'04), pp. 72-84, Boston, USA, Oct. 9-13, 2004.

U.S. Appl. No. 15/181,427 Office Action dated Jan. 13, 2017.

\* cited by examiner

SECURE MEMORY INTERFACE WITH CUMULATIVE AUTHENTICATION

CROSS-REFERENCE TO RELATED APPLICATIONS

This application claims the benefit of U.S. Provisional Patent Application 61/880,932, filed Sep. 22, 2013, whose disclosure is incorporated herein by reference.

FIELD OF THE INVENTION

The present invention relates generally to data security, and particularly to methods and systems for authenticating encrypted data.

BACKGROUND OF THE INVENTION

Data authentication schemes are used in a variety of applications, for example in order to protect from cryptographic attacks. For example, U.S. Pat. No. 8,429,513, whose disclosure is incorporated herein by reference, describes a method of verifying the integrity of code in a programmable memory. The method includes receiving the code from an insecure memory, generating error detection bits for the code as it is received from the insecure memory, storing the code and the error detection bits in the programmable memory, and verifying the integrity of the code stored in the programmable memory by performing an authentication check on the code and the error detection bits stored in the programmable memory.

U.S. Patent Application Publication 2012/0102307, whose disclosure is incorporated herein by reference, describes a secure execution environment for execution of sensitive code and data including a secure asset management unit (SAMU). The SAMU provides a secure execution environment to run sensitive code, for example, code associated with copy protection schemes established for content consumption. The SAMU architecture allows for hardware-based secure boot and memory protection and provides on-demand code execution for code provided by a host processor. The SAMU may boot from an encrypted and signed kernel code, and execute encrypted, signed code. The hardware-based security configuration facilitates preventing vertical or horizontal privilege violations.

U.S. Patent Application Publication 2006/0253708, whose disclosure is incorporated herein by reference, describes a method for recording at least one block of variable data in a first volatile memory external to a microprocessor, including calculating and storing a digital signature taking into account at least partially the address and the content of said data block in the memory, and at least a first random digital value internal to the microprocessor.

Australian Patent Application Publication AU 2001/027074, whose disclosure is incorporated by reference, describes techniques that efficiently ascertain that data are valid. The verification process of partial data is executed by collating the integrity partial data as check values for a combination of partial data of a content, and the verification process of the entirety of the combination of partial data is executed by collating partial integrity-check-value-verifying integrity check values that verify the combination of the partial integrity check values.

SUMMARY OF THE INVENTION

An embodiment of the present invention that is described herein provides a method including generating a first sequence of data words for sending over an interface. A second sequence of signatures is computed and interleaved into the first sequence, so as to produce an interleaved sequence in which each given signature cumulatively signs the data words that are signed by a previous signature in the interleaved sequence and the data words located between the previous signature and the given signature. The interleaved sequence is transmitted over the interface.

In some embodiments, computing the signatures includes generating each signature in the interleaved sequence as a respective function of the data words that precede the signature in the interleaved sequence. In other embodiments, computing the signatures includes generating each signature in the interleaved sequence as a function of a respective number of the data words that increases along the interleaved sequence.

In some embodiments, the method includes receiving the interleaved sequence from the interface, and progressively authenticating the first sequence of the data words using the second sequence of the signatures. Authenticating the data words typically includes authenticating, using each given signature, the data words that were authenticated by the previous signature in the interleaved sequence and the data words located between the previous signature and the given signature.

In some embodiments, computing the second sequence of the signatures includes applying a linear feedback shift register (LFSR) to the data words, and applying a non-linear function to an output of the LFSR. In other embodiments, computing the second sequence of the signatures includes setting a first subset of bits in a given signature to sign the data words that precede the given signature in the interleaved sequence, and deriving a second subset of the bits in the given signature from an error detection code that has been computed over one or more of the data words and stored in the memory.

In some embodiments, the method includes cryptographically assigning bit positions in the given signature to the first and second subsets using a cryptographic function. In other embodiments, the method includes receiving the interleaved sequence from the interface, extracting the first and second subsets of the bits from the signatures, assessing an integrity of transferring the data words over the interface using the first subsets, and assessing the integrity of storing the data words in the memory using the second subsets.

There is also provided, in accordance with an embodiment of the present invention, an apparatus including a memory and a memory authentication unit. The memory authentication unit is configured to generate a first sequence of data words for sending over an interface, to compute and interleave into the first sequence a second sequence of signatures so as to produce an interleaved sequence in which each given signature cumulatively signs the data words that are signed by a previous signature in the interleaved sequence and the data words located between the previous signature and the given signature, and to transmit the interleaved sequence over the interface.

There is also provided, in accordance with an embodiment of the present invention, a method including receiving over an interface an interleaved sequence formed from a first sequence of data words and a second sequence of signatures, such that each given signature cumulatively signs the data words that are signed by a previous signature in the interleaved sequence and the data words located between the previous signature and the given signature. The first sequence of the data words is progressively authenticated using the second sequence of the signatures.

There is also provided, in accordance with an embodiment of the present invention an apparatus including an authentication unit and a processor. The authentication unit is configured to receive over an interface an interleaved sequence formed from a first sequence of data words and a second sequence of signatures, such that each signature cumulatively signs the data words that are signed by a previous signature in the interleaved sequence and the data words located between the previous signature and the given signature, and to progressively authenticate the first sequence of the data words using the second sequence of the signatures. The processor is configured to process the authenticated data words.

The present invention will be more fully understood from the following detailed description of the embodiments thereof, taken together with the drawings in which:

DETAILED DESCRIPTION OF EMBODIMENTS

Overview

In many secure storage systems, a host communicates with a memory device over a memory bus interface such that the data in transit may be vulnerable to various cryptographic attacks. Embodiments of the present invention described herein provide improved methods and systems for progressively authenticating encrypted data communicated over the bus interface and identifying whether the communicated encrypted data was tampered with or compromised by an attacker.

In some embodiments described herein, a memory device comprises a memory and a memory authentication unit (MAU). When the memory device prepares to send data over the bus interface to the host, the MAU fetches data from the memory and generates a first sequence of encrypted data words. In parallel, the MAU computes a second sequence of signature words based on the fetched data.

The MAU is configured to interleave the sequence of data words with the sequence of signature words for transmission over the bus interface, such that each signature word cumulatively signs the data words that precede that signature word in the interleaved sequence. In other words, each given signature word in the interleaved sequence (with the exception of the first signature word) signs the data words that were signed by the previous signature word, and the data words located between the previous signature word and the given signature word. The authentication strength thus becomes cumulatively stronger with each data word sequence that is authenticated.

The host receives the interleaved sequence, separates the data words from the signature words and decrypts the data words, using a host authentication unit (HAU). In parallel, the HAU computes the signature words from the received decrypted data and compares the computed signature words with the corresponding received signature words so as to authenticate the data words. In other words, the HAU uses each signature word in the interleaved sequence to authenticate the data words authenticated by the previous signature word, and the data words located between the previous signature word and the given signature word.

Put in another way, in the disclosed technique the memory device periodically sends signature words that sign a progressively-increasing number of data words. The first signature word in the sequence may provide only modest authentication performance, but the authentication performance improves considerably in subsequent signature words. At the same time, the latency incurred by the authentication process is very low, since there is no need to wait until a large block of data words has been accumulated in order to validate the signature. This combination of reliable authentication and small latency is particularly useful for real-time code authentication, i.e., when the data words transferred over the interface convey software code that the host runs in real time.

In some embodiments, the host can also be used to remotely validate the integrity of data stored on the memory device itself. In these embodiments, the MAU stores groups of data words in the memory along with corresponding error detecting codes that detect changes in the data words stored in the memory. If an attacker attempts to tamper with the data and/or dedicated logic circuitry in the memory device, which is used to verify the stored data integrity, the memory device can no longer be trusted to assess the integrity of the data stored in its own memory. In some embodiments presented hereinbelow, the host is used to remotely validate the integrity of the stored data on the memory device.

In these embodiments, the MAU forms hybrid signature words comprising a combination of both memory integrity bits and interface authentication bits. The interface authentication bits are derived from the signature words described above, whereas the memory integrity bits are derived from the error detecting codes stored in the memory along with the data.

In an embodiment, the bits in the hybrid signature words are cryptographically computed both from the interface authentication bits and memory integrity bits. By themselves, the memory integrity bits typically have no cryptographic strength, and can be easily tampered with. The disclosed technique, however, effectively hides the memory integrity bits by making them indistinguishable from the interface authentication bits. As such, identifying and modifying the memory integrity bits is considerably more complex. The hybrid signature words are then sent to the host over the bus interface in the same manner (e.g., in the interleaved sequence) as described previously. The host can then extract interface authentication bits to authenticate the interface, and memory integrity bits to authenticate the data stored in the memory.

System Description

Figure 1A:
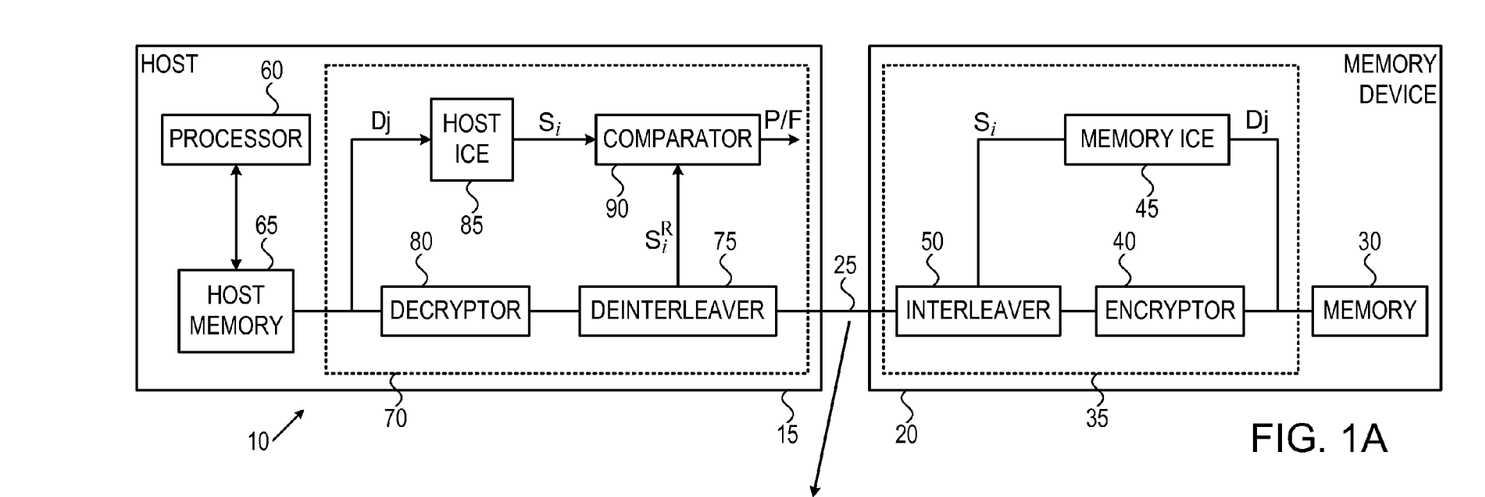
FIG. 1A is a block diagram that schematically illustrates a computing system, in accordance with an embodiment of the present invention.

FIG. 1A is a block diagram that schematically illustrates a computing system 10, in accordance with an embodiment of the present invention. System 10 comprises a host 15 and a memory device 20. Host 15 and memory device 20 communicate with one another over a bus interface 25. System 10 may comprise, for example, a computer. Host 15 may comprise the central processing unit (CPU) of the computer. Memory device 20 may comprise an external memory device that uses any suitable type of memory, such as Flash memory or random access memory, for example.

In a typical flow, host 15 sends a request for data to memory device 20 over bus interface 25. Memory device 20 fetches data words from a memory 30. The data words are denoted $D_j$, where j is an integer denoting the $j^{th}$ data word in the interleaved sequence as will be discussed later. The data words are relayed to a memory authentication unit (MAU) 35 connected to memory 30. An encryptor 40 in MAU 35 encrypts the data words $D_j$. Similarly, a memory integrity check engine (ICE) 45 uses $D_j$ as the input and computes signature words denoted $S_i$ where i in an integer denoting the $i^{th}$ signature word. Finally, an interleaver 50 creates an interleaved sequence comprising $D_j$ and $S_i$ as will be shown in the next figure.

Host 15 comprises a processor 60 and a host memory 65. Host memory 65 is connected to a host authentication unit (HAU) 70. HAU 70 comprises a deinterleaver 75 which separates the encrypted data words from the received signature words denoted $S_i^R$ in the received interleaved data where i in an integer denoting the $i^{th}$ signature word in the interleaved sequence. A decryptor 80 then extracts the data words denoted $D_j$ from deinterleaver 75.

A host integrity check engine (ICE) 85 receives the extracted data words $D_j$, which are used to compute the signature words $S_i^R$ from the data words $D_j$. To authenticate the data words $D_j$ as being true to the data words signed in memory 30, a comparator 90 assesses if $S_i = S_i^R$ by indicating a pass or fail as shown as P/F in FIG. 1A to processor 60. For a pass, the current received signature word $S_i^R$ authenticates all of the signed data words that preceded $S_i^R$ for a given index i.

System 10 shown in FIG. 1A is shown merely by way of example and not by way of limitation of the embodiments of the present invention. For example, memory ICE 45 and host ICE 85 may configured to compute the signature words from the encrypted data words (not as shown in FIG. 1A). The different elements of host 10 and memory device 20 may each be implemented may be implemented using any suitable hardware, such as Application-specific Integrated Circuit or Field-Programmable Gate Arrays (FPGA). In some embodiments, the functions may be implemented using discrete elements on a printed circuit board (PCB), or a combination thereof in any suitable manner. In other embodiments, memory 30 and MAU 35 are typically packaged together in the same device package, so as to provide a self-contained secure memory device.

In some embodiments, bus interface 25 may be a parallel interface providing address, data and commands over separate signal lines. In other embodiments, bus interface 25 may be a serial interface, such as a serial peripheral interface (SPI), Inter-Integrated Circuit (I²C), universal serial bus (USB), multimedia card (MMC), or secure digital (SD) interface. Bus interface 25 may be any suitable interface implemented on die and/or on a printed circuit board (PCB). Memory 30 and host memory 65 may be random access memory (RAM), non-volatile memory (NVM), or both.

In other embodiments, certain elements of host 15 and/or memory device 20, such as MAU 35, HAU 35 and processor 60 may be implemented with a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Cumulative Data Authentication Over a Secure Memory Interface by Interleaving Data and Signature Words The methods for cumulative data authentication taught in the embodiments described herein are typically directed to scenarios where host 15 and memory device 20 are detached. The data requested by host 15 is sent over bus interface 25. Even though the data is encrypted, an attacker can attempt to gain access to the data or otherwise affect the system by altering certain bits in the data stream over interface 25.

In some embodiments, the data is authenticated by the use of digital signatures. A digital signature is a function of the data that can be calculated using a dedicated secret, usually a secret digital key word, known to both host 15 and memory device 20. In receiving the data, host 15 must know the dedicated secret used to generate the signature in the memory device in order to calculate the same signature from the received data words in order to verify that the received and computed signatures match. This authenticates the signed data words, and also indicates that the data has not been tampered with across the bus interface. For long blocks of data, the data is first hashed and the function is applied to the hash.

The embodiments described herein particularly relate to a scenario where host 15 runs code that is fetched in real time from memory device 20. In this case, conventional block authentication approaches are typically unsuitable since the latency times associated with host 15 authenticating the data are very long. Moreover, conventional cryptographic signatures are typically at least eight bytes long, and communicating such signatures in real time over bus interface 25 would severely reduce the channel throughput over the bus interface.

In the embodiments described herein, the signature process is cumulative since, the signature words are constantly being computed in MAU 35 using the data passing through from memory 30 to MAU 35. This is illustrated in an exemplary embodiment where a respective 1-byte signature word is added and transmitted every four 1-byte data words, such that each signature word signs all the preceding data words in the sequence.

If an attacker modifies the first four data words, the first signature word can detect the attack with a probability p=255/256. This probability may not be high enough for normal cryptographic algorithms, but the second signature word signs the last eight data words. In this case the probability mis-detecting the attack is now $(1-p)^2$, and the probability of mis-detecting an attack with the $i^{th}$ signature word $S_i$ is $(1-p)^i$. Thus, any changes made by an attacker to the data words in transit over the bus interface can be detected with a very high probability.

Figure 1B:
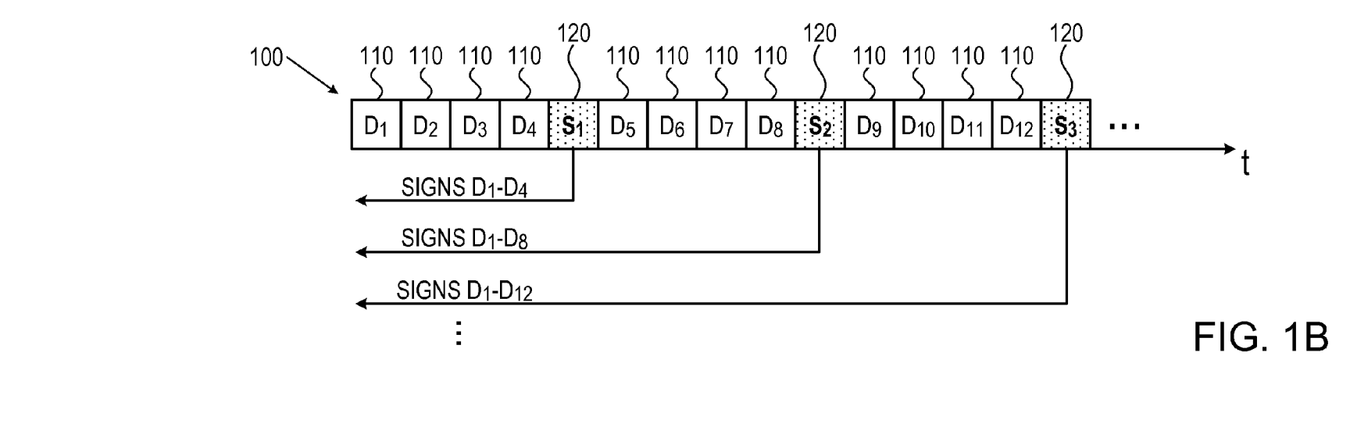
FIG. 1B is a diagram that illustrates an interleaved data sequence transmitted over a bus interface, in accordance with an embodiment of the present invention.

FIG. 1B is a diagram that illustrates an interleaved data sequence 100 transmitted over bus interface 25, in accordance with an embodiment of the present invention. Multiple data words 110 denoted $D_j$ are interleaved with signature words 120 denoted $S_i$ as described previously. In the exemplary example shown in FIG. 1B, signature word $S_1$ signs data words $D_1$-$D_4$, signature word $S_2$ signs data words $D_1$-$D_8$, signature word $S_3$ signs data words $D_1$-$D_{12}$, and so forth. Note that in FIG. 1B, data words 100 denoted ($D_1$, $D_2$, ... $D_j$) are the encrypted version of data words $D_j$ shown in FIG. 1A. The terms "signature word" and "signature" may be used herein interchangeably.

Figure 2:
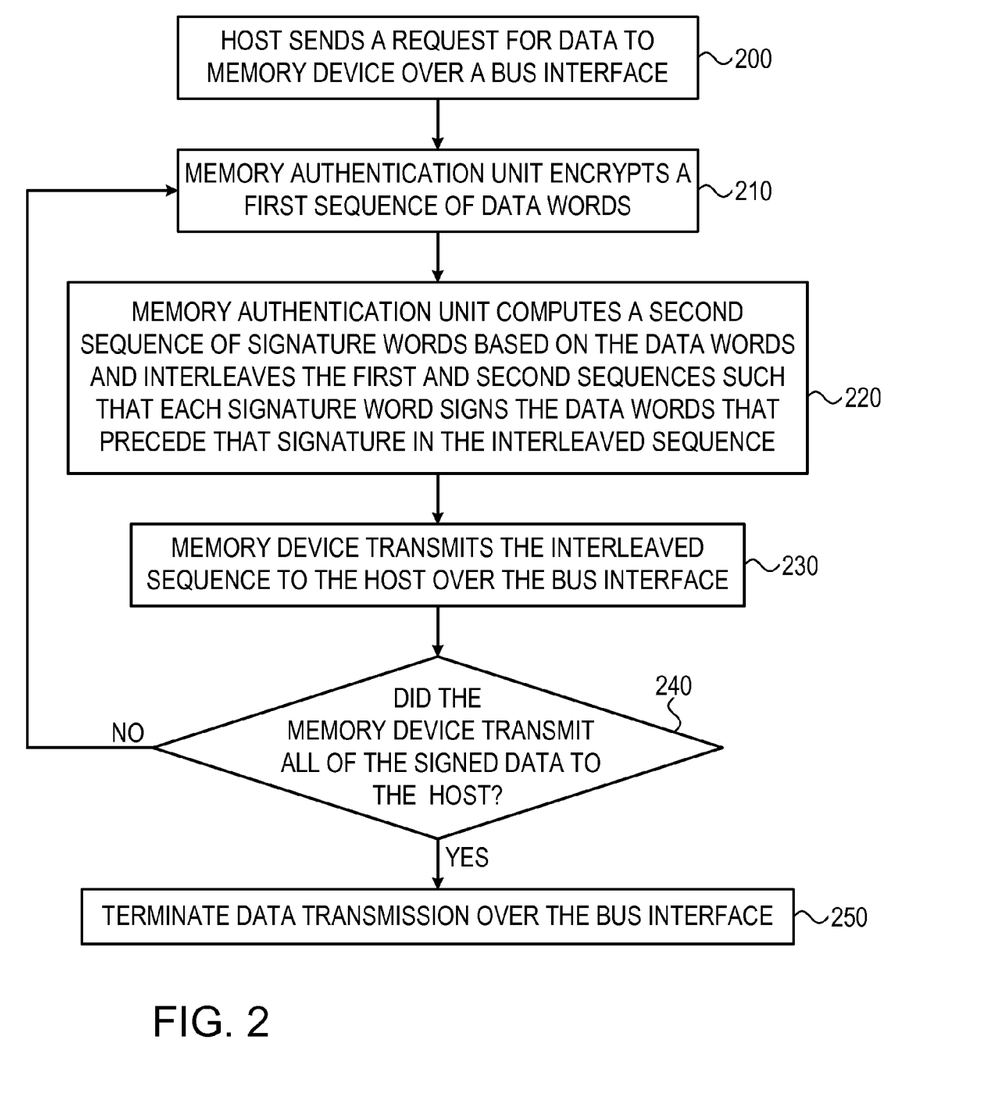
FIG. 2 is a flow chart that schematically illustrates a method for signing a data sequence for transmission over a bus interface, in accordance with an embodiment of the present invention.

FIG. 2 is a flow chart that schematically illustrates a method for signing data sequence 100 for transmission over bus interface 25, in accordance with an embodiment of the present invention. In a sending step 200, host 15 sends a request for data to memory device 20 over bus interface 25. Memory device 20 reads the requested data from memory 30. In an encrypting step 210, memory authentication unit (MAU) 35 encrypts a first sequence of data words (e.g., data words 100 shown in FIG. 1B).

In a computing and interleaving step 220, MAU 35 computes a second sequence of signature words $S_i$ shown as signature words 120 in FIG. 1B and interleaves the first ($D_j$) and second ($S_i$) sequences such that each signature word $S_i$ signs the data words $D_j$ the precede that signature word in interleaved data sequence 100 as shown in FIG. 1B.

In a transmitting step 230, memory device 20 transmits interleaved sequence 100 to host 15 over bus interface 25. In a decision step 240, host 15 assesses if memory device transmitted all of the signed data. If not, memory device 20 continues to read data from memory 30 and MAU 35 continues to encrypt the read data in encrypting step 210. If so, transmission of data over bus interface 25 is terminated in a terminating step 250.

Figure 3:
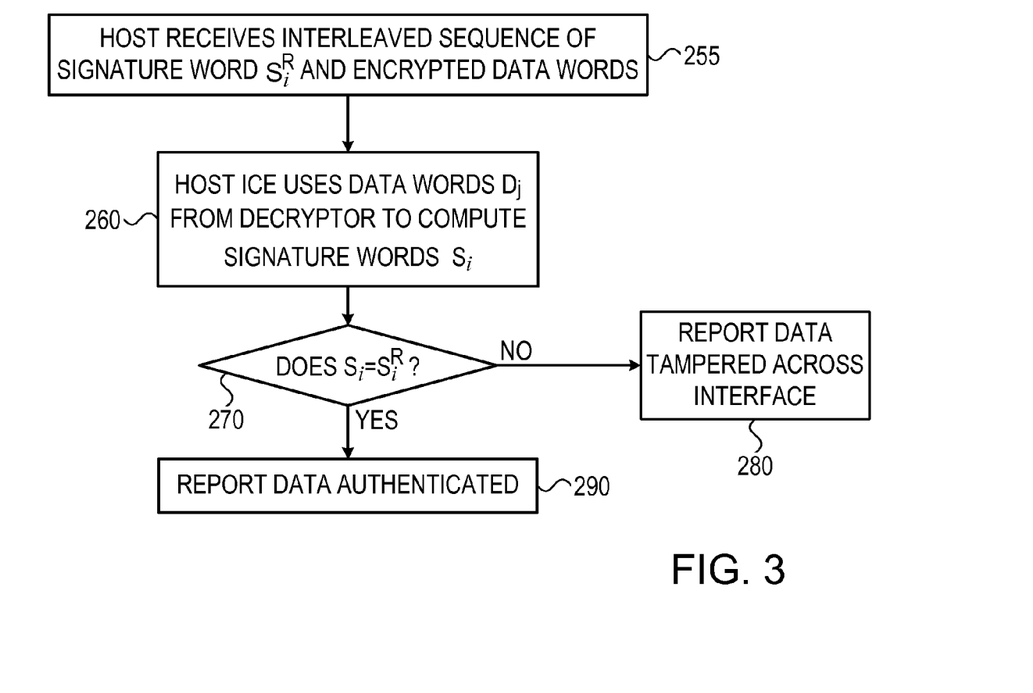
FIG. 3 is a flow chart that schematically illustrates a method for authenticating signed data received over a bus interface, in accordance with an embodiment of the present invention.

FIG. 3 is a flow chart that schematically illustrates a method for authenticating signed data received over bus interface 25, in accordance with an embodiment of the present invention. In a receiving step 255, host 15 receives interleaved sequence 100 of received signature words $S_i^R$ and encrypted data words 110. Deinterleaver 75 separates the received signature words $S_i^R$ from the encrypted data words. The encrypted data words are decrypted in decryptor 80.

In a using step 260, host ICE 85 uses decrypted data words $D_j$ to compute signature words $S_i$. In a decision step 270, comparator 90 assesses whether the computed signature word $S_i$ and received signature word $S_i^R$ are equal. If not, comparator 90 reports (typically to processor 60) that the data was tampered with across bus interface 25, in a failure reporting step 280. Otherwise, comparator 90 reports (typically to processor 60) an authentication success, in a success reporting step 290.

The disclosed techniques illustrated in the flow charts of FIGS. 2 and 3 are not limited to authenticating data sent from a memory device to a host. The disclosed cumulative authentication schemes can be used in the opposite direction, i.e., to authenticate data sent from the host to the memory device, and/or generally over any other suitable interface.

Computing Signature Words for Cumulative Authentication

In the embodiments of the present invention, signature words 120 are computed both in MAU 35 and HAU using an Integrity Check Engine (ICE) shown as host ICE 85 and memory ICE 45, respectively, in host 15 and memory device 20. The ICE typically hashes the input data words $D_j$ to calculate the signature words $S_i$. A hash register is used to calculate and store the hash of the data words transmitted over the bus. The hash register may be implemented as a linear feedback shift register (LFSR).

Figure 4A:
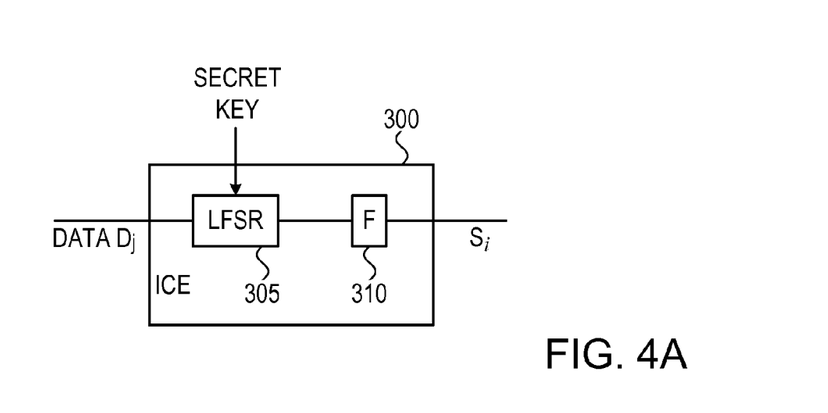
FIG. 4A is a block diagram that schematically illustrates a first implementation of an integrity check engine, in accordance with an embodiment of the present invention.

FIG. 4A is a block diagram that schematically illustrates a first implementation of an integrity check engine (ICE) 300, in accordance with an embodiment of the present invention. ICE 300 in FIG. 4A is a representation of host ICE 85 and memory ICE 45 blocks shown in FIG. 1A. 8-bit data words $D_j[7:0]$ are input to an LFSR 305. For the example shown here, LFSR 305 is initialized with a secret key. LFSR 305 is assumed to be large enough, e.g., at least 64 bits wide, such that an attacker will not be able to guess, or assess, the contents of LFSR 305 by extensive computational analyses (e.g., by "brute force").

The output of LFSR 305 is input to a block F 310, which is configured to apply a suitable non-linear function F which is used to calculate the signature bits of signature words $S_i[7:0]$ from a subset of the hash register bits (e.g., the bits of LFSR 305). LFSR 305 is now assumed to operate with 64 bits in this exemplary embodiment and the output bits of LFSR 305 is denoted LFSR[64:0]. In some embodiments, the signature bits of $i^{th}$ signature word $S_i[7:0]$ can be calculated from the LFSR output with data input $D_j[7:0]$, for example, by Eqn. (1):

$$F[7:0]=(LFSR[7:0]\text{bitwise-and }LFSR[15:8])\text{bitwise-or}(LFSR[15:8]\text{bitwise-and }LFSR[23:16])\text{bitwise-or}(LFSR[23:16]\text{bitwise-and }LFSR[7:0]) \quad (1)$$

The embodiment shown in FIG. 4A and in Eqn. (1) is merely for conceptual clarity and not by way of limitation of the embodiments of the present invention. The ICE can be implemented by any suitable circuitry using any suitable algorithm to form signature words 120 used for cumulative data word signing in interleaved data sequence 100 as shown in FIG. 1B. In other embodiments, the ICE 300 can be used in host 15 to hash the request command and address of the read command that can be sent to memory device 20 in a secure encrypted manner in step 200 (not shown in the Figures). Subsequently, the read command and address can be signed and authenticated in system 10 using the same approach as the embodiments described herein.

A data set comprises the data from all of the data words sent over the bus interface. In some embodiments, some signature words 120 in interleaved sequence 100 may be sent by memory device 20 in order to sign the data set after all of the data words have been received by the host and authenticated. In other embodiments, other authentication methods to authenticate the entire data set may be used in addition to the methods described herein after all of the data words in the data set have been received by the host. In yet other embodiments, function F 310 may be configured to select which bits in signature word 120 may be used to cumulatively sign the data words and which bits sign the entire data set.

Signature Words for Cumulative Data Authentication and Assessing Memory Integrity Over Secure Memory Interface In additional embodiments provided herein, the method of interleaving signature and data words is not only limited to cumulatively sign and authenticate data words sent over bus interface 25 as described previously. Host 15 may also use these methods to remotely verify the integrity of data stored in memory 30.

In these embodiments, MAU 35 stores the data in memory 30 in an array where each group of data words is stored along with a respective error detection code (EDC) word computed over the group. The EDC may comprise, for example, a 32-bit cyclic redundancy check (CRC-32) code or any other suitable EDC. Dedicated logic circuitry in memory device 20 (possibly in MAU 35) is typically used to verify the data integrity by re-computing the EDCs from the stored data which and comparing the computed EDCs with the stored EDCs in memory 30.

In some scenarios, however, an attacker may tamper with the memory device internal circuitry, and therefore this internal authentication mechanism may not always be trustworthy. In embodiments of the present invention, MAU 35 delegates the task of authenticating the stored data using the EDC to host 15.

In some embodiments, MAU 35 forms hybrid signature words comprising both signature bits (e.g., interface authentication bits) used for cumulatively signing the data, and memory integrity bits derived from the EDC words stored in the memory, which are used to verify the integrity of data stored in memory 30. The embodiments taught herein describe methods in which memory 20 forms the hybrid signature words, and conversely, methods in which host 15 both authenticates the signed data words in a similar manner described previously, and also remotely validates the integrity of the data stored in memory 30.

For conceptual clarity in explaining the embodiments hereinbelow using in FIGS. 1A and 1B, hybrid signature words denoted by symbol $HS_i$ can be used interchangeably with symbol $S_i$. The hybrid signature words can also be represented by signature words 120, which are also interleaved in a similar manner in FIG. 1B with data words 110 in data sequence 100 and sent to host 15 over bus interface 25. The terms "hybrid signature word" and "hybrid signature" may be used herein interchangeably.

Figure 4B:
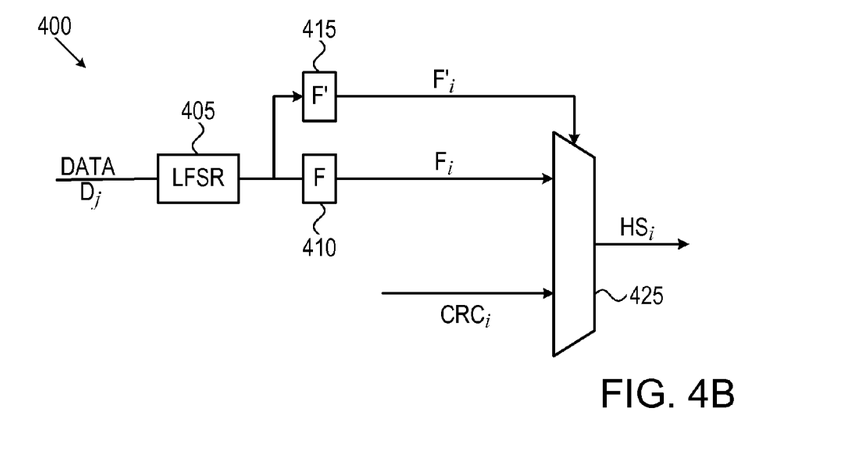
FIG. 4B is a block diagram that schematically illustrates a second implementation of an integrity check engine, in accordance with an alternative embodiment of the present invention.

FIG. 4B is a block diagram that schematically illustrates a second implementation of an integrity check engine (ICE) 400, in accordance with an alternative embodiment of the present invention. ICE 400 is used to generate hybrid signature words denoted $HS_i$ in memory device 20.

ICE 400 operates similarly to ICE 300 in that data words $D_j[7:0]$ are input to an LFSR 405. For the example shown in FIG. 4B, LFSR 405 is initialized by a secret key (not shown here) and is assumed to operate with 64 bits. The output LFSR[64:0] of LFSR 405 is input to a block F 410, which is configured to apply any non-linear function F, such as described in Eqn. (1) which is used to calculate the signature bits of signature words $S_i[7:0]$ from a subset of the hash register bits (e.g., LFSR 405).

However, the hybrid signature bits of $i^{th}$ hybrid signature word $HS_i[7:0]$ are not only calculated from the LFSR output but also from EDC words (e.g., CRC-32 words) stored along with and fetched with data words $D_j[7:0]$ in memory 30. In the embodiments described herein, the bits of the hybrid signature words $HS_i$ are formed from both interface authentication bits and memory integrity bits for verifying memory integrity to be described later. The interface authentication bits are derived from Eqn. (1) and used to cumulatively sign data words 110 as described previously.

In addition to data words $D_j[7:0]$, ICE engine 400 also receives as input the EDC words stored with data words $D_j[7:0]$ denoted $CRC_i[7:0]$. Data words $D_j[7:0]$ are also input to F' block 415, which applies a function F'[7:0] to a subset of hash register bits (e.g., LFSR[64:0]) according to Eqn. (2):

$$F'[7:0]=LFSR[39:32]\text{bitwise-and } LFSR[31:24] \quad (2)$$

Essentially, F'[7:0] is a function that is applied to a control (bit selection) terminal of a multiplexer 425 that has $F_i[7:0]$ and $CRC_i[7:0]$ as the signal inputs to multiplexer 425. Integer k represents the $k^{th}$ bit where k=0, 1, 2, . . . , 7 in interface authentication bits F[k], multiplexer control bits F'[k], and memory integrity bits CRC[k]. The hybrid signature bits HS[k] forming eight bit hybrid signature words 120 can be computed from Eqn. (3) given by:

$$HS[k]=F[k] \text{ when } F'[k]=0, \text{ else } CRC[k] \quad (3)$$

In this manner, the bits HS[k] forming the hybrid signature word share both interface authentication bits F[k] and memory integrity bits CRC[k] in a nearly random manner as computed from LFSR[64:0] rendering an attack to decode the cryptographic methods in forming the hybrid signature words as nearly improbable.

In some embodiments, a modified configuration of ICE engine 400 can be used to implement host ICE 85 shown in FIG. 1A. In the host, however, $CRC_i$ is computed over the received data words.

Figure 5:
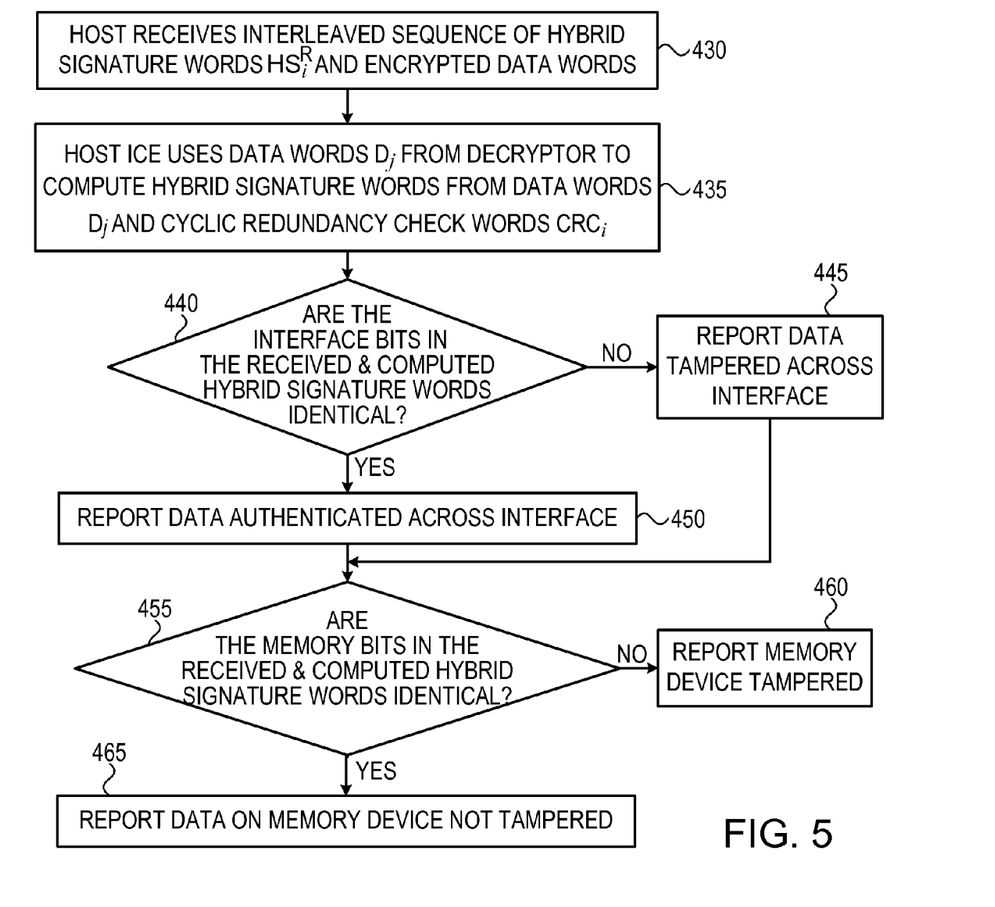
FIG. 5 is a flow chart that schematically illustrates a method for jointly authenticating data received over a bus interface and validating data stored in a memory, in accordance with an embodiment of the present invention.

FIG. 5 is a flow chart that schematically illustrates a method for jointly authenticating data 100 received over bus interface 25 and validating data stored in memory 30, in accordance with an embodiment of the present invention. In a receiving step 430, host 15 receives interleaved sequence 100 of hybrid signature words $HS_i^R$ and encrypted data words from memory device 20 over bus interface 25.

In a using step 435, host ICE 85 (implemented with ICE 400) uses data words $D_j$ from decryptor 80 to compute hybrid signature words $HS_i$ from data words $D_j$ and cyclic redundancy check words $CRC_i$. The hybrid signature bits HS[k] in each (hybrid) signature word 120 (received $HS_i^R$ and computed $HS_i$) are analyzed both for authenticating the data for tampering over bus interface 25 and for remotely verifying the integrity of data stored in memory 30.

In a decision step 440, comparator 90 assesses whether the interface authentication bits (e.g., F[k]) are identical in the received and computed signature words by assessing if the following logical equality holds in Eqn. (4):

$$(HS[k])\text{bitwise-and}(notF'[k])=F[k]\text{bitwise-and }(notF'[k]) \quad (4)$$

If comparator 90 assesses that the logical equality in Eqn. (4) holds, comparator 90 reports that the received data authenticated across bus interface 25 in a reporting step 450. If not, comparator 90 reports that the data was tampered across bus interface 25 in a reporting step 445. Stated differently, step 450 progressively authenticates the data words $D_j$ 110 in interleaved sequence 100.

In a second decision step 455, comparator 90 assesses whether the memory integrity bits CRC[k] comparing the received $HS_i^R$ and computed $HS_i$ signature words are identical by comparator 90 assessing if the following logical equality holds in Eqn. (5):

$$(HS[k])\text{bitwise-and}(F'[k])==F[k]\text{bitwise-and }(F'[k]) \quad (5)$$

If comparator 90 assesses that the logical equality in Eqn. (5) holds, comparator 90 reports that the data stored in memory 30 in memory device 20 is not tampered with, which verifies the integrity of the stored data in a reporting step 465. If not, comparator 90 reports that the data stored in memory device 20 was tampered with in a reporting step 460. Stated differently, step 465 progressively verifies the integrity of the data words $D_j$ 110 in interleaved sequence 100 stored in memory 30.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of encoding data for transmission, comprising:
   receiving, by hardware circuitry, a sequence of data words for sending over an interface;
   using the circuitry, preparing a first signature that signs the data words up to a first location in the sequence, and preparing a second signature that signs the data words up to a second location in the sequence, later in the sequence than the first location, wherein:
   (i) the second signature signs the data words that were signed by the first signature, plus the data words located between the first location and the second location; and
   (ii) a probability of detecting alteration of bits within the data words based on the first and second signatures is higher than the probability of detecting the alteration of bits based on the first signature without the second signature;
   transmitting the sequence of data words with the first and second signatures interleaved therein over the interface, so as to convey the data words and the first and second signatures to a host; and
   receiving the sequence with the first and second signatures from the interface, and progressively authenticating the data words using the first and second signatures by authenticating, using the second signature, the data words that were authenticated by the first signature and the data words located between the first signature and the second signature.

2. The method according to claim 1, wherein preparing the first and second signatures comprises generating each of the first and second signatures as a respective function of the data words that precede that signature in the sequence.

3. The method according to claim 1, wherein preparing the first and second signatures comprises generating each of the first and second signatures as a function of a respective number of the data words that increases along the sequence.

4. The method according to claim 1, wherein preparing the first and second signatures comprises applying a linear feedback shift register (LFSR) to the data words, and applying a non-linear function to an output of the LFSR.

5. The method according to claim 1, wherein preparing the first and second signatures comprises setting a first subset of bits in a given signature to sign the data words that precede the given signature in the sequence, and deriving a second subset of the bits in the given signature from an error detection code that has been computed over one or more of the data words and stored in the memory.

6. A method of encoding data for transmission, comprising:
   receiving, by hardware circuitry, a sequence of data words for sending over an interface;
   using the circuitry, preparing a first signature that signs the data words up to a first location in the sequence, and preparing a second signature that signs the data words up to a second location in the sequence, later in the sequence than the first location, wherein:
   (i) the second signature signs the data words that were signed by the first signature, plus the data words located between the first location and the second location; and
   (ii) a probability of detecting alteration of bits within the data words based on the first and second signatures is higher than the probability of detecting the alteration of bits based on the first signature without the second signature; and
   transmitting the sequence of data words with the first and second signatures interleaved therein over the interface, so as to convey the data words and the first and second signatures to a host,
   wherein preparing the first and second signatures comprises setting a first subset of bits in a given signature to sign the data words that precede the given signature in the sequence, and deriving a second subset of the bits in the given signature from an error detection code that has been computed over one or more of the data words and stored in the memory, and assigning bit positions in the given signature to the first and second subsets using a cryptographic function.

7. A method of encoding data for transmission, comprising:
   receiving, by hardware circuitry, a sequence of data words for sending over an interface;
   using the circuitry, preparing a first signature that signs the data words up to a first location in the sequence, and preparing a second signature that signs the data words up to a second location in the sequence, later in the sequence than the first location, wherein:
   (i) the second signature signs the data words that were signed by the first signature, plus the data words located between the first location and the second location; and
   (ii) a probability of detecting alteration of bits within the data words based on the first and second signatures is higher than the probability of detecting the alteration of bits based on the first signature without the second signature; and
   transmitting the sequence of data words with the first and second signatures interleaved therein over the interface, so as to convey the data words and the first and second signatures to a host,
   wherein preparing the first and second signatures comprises setting a first subset of bits in a given signature to sign the data words that precede the given signature in the sequence, and deriving a second subset of the bits in the given signature from an error detection code that has been computed over one or more of the data words and stored in the memory; and
receiving the sequence with the first and second signatures from the interface, extracting the first and second subsets of the bits from each of the signatures, determining, using the first subset, the integrity with which the data words were transferred over the interface, and determining, using the second subset, the integrity with which the data words have been stored in the memory.

8. An apparatus, comprising:
a memory;
a hardware-implemented memory authentication unit, which is configured to receive a sequence of data words for sending over an interface, to prepare a first signature that signs the data words up to a first location in the sequence, to prepare a second signature that signs the data words up to a second location in the sequence, later in the sequence than the than the first location, wherein (i) the second signature signs the data words that were signed by the first signature, plus the data words located between the first location and the second location, and (ii) a probability of detecting alteration of bits within the data words based on the first and second signatures is higher than the probability of detecting the alteration of bits based on the first signature without the second signature, and to transmit the sequence of data words with the first and second signatures interleaved therein over the interface, so as to convey the data words and the first and second signatures for authentication over the interface; and
a host, configured to receive the sequence with the first and second signatures from the interface, to progressively authenticate the data words using the first and second signatures by authenticating, using the second signature, the data words that were authenticated by the first signature and the data words located between the first signature and the second signature.

9. The apparatus according to claim 8, wherein the memory authentication unit is configured to generate each of the first and second signatures as a respective function of the data words that precede that signature in the sequence.

10. The apparatus according to claim 8, wherein the memory authentication unit is configured to generate each of the first and second signatures as a function of a respective number of the data words that increases along the sequence.

11. The apparatus according to claim 8, wherein the memory authentication unit is configured to sign the data words by applying a linear feedback shift register (LFSR) to the data words and applying a non-linear function to an output of the LFSR.

12. The apparatus according to claim 8, wherein the memory authentication unit is configured to set a first subset of bits in a given signature to sign the data words that precede the given signature in the sequence, and to derive a second subset of the bits in the given signature from an error detection code that has been computed over one or more of the data words and stored in the memory.

13. An apparatus, comprising:
a memory; and
a hardware-implemented memory authentication unit, which is configured to receive a sequence of data words for sending over an interface, to prepare a first signature that signs the data words up to a first location in the sequence, to prepare a second signature that signs the data words up to a second location in the sequence, later in the sequence than the than the first location, wherein (i) the second signature signs the data words that were signed by the first signature, plus the data words located between the first location and the second location, and (ii) a probability of detecting alteration of bits within the data words based on the first and second signatures is higher than the probability of detecting the alteration of bits based on the first signature without the second signature, and to transmit the sequence of data words with the first and second signatures interleaved therein over the interface, so as to convey the data words and the first and second signatures for authentication over the interface,
wherein the memory authentication unit is configured to set a first subset of bits in a given signature to sign the data words that precede the given signature in the sequence, to derive a second subset of the bits in the given signature from an error detection code that has been computed over one or more of the data words and stored in the memory, and to assign bit positions in the given signature between the first and second subsets using a cryptographic function.

14. An apparatus, comprising:
a memory;
a hardware-implemented memory authentication unit, which is configured to receive a sequence of data words for sending over an interface, to prepare a first signature that signs the data words up to a first location in the sequence, to prepare a second signature that signs the data words up to a second location in the sequence, later in the sequence than the than the first location, wherein (i) the second signature signs the data words that were signed by the first signature, plus the data words located between the first location and the second location, and (ii) a probability of detecting alteration of bits within the data words based on the first and second signatures is higher than the probability of detecting the alteration of bits based on the first signature without the second signature, and to transmit the sequence of data words with the first and second signatures interleaved therein over the interface, so as to convey the data words and the first and second signatures for authentication over the interface, wherein the memory authentication unit is further configured to set a first subset of bits in a given signature to sign the data words that precede the given signature in the sequence, and to derive a second subset of the bits in the given signature from an error detection code that has been computed over one or more of the data words and stored in the memory; and
a host configured to receive the sequence with the first and second signatures from the interface, to extract the first and second subsets of the bits from each of the signatures, to determine, using the first subset, the integrity with which the data words were transferred over the interface, and to determine, using the second subset, the integrity with which the data words have been stored in the memory.

* * * * *